Feb. 23, 1943. C. J. CALBICK 2,312,206
METHOD OF AND APPARATUS FOR REDUCING HALO FROM FLUORESCENT SCREENS
Filed June 12, 1940 2 Sheets-Sheet 1
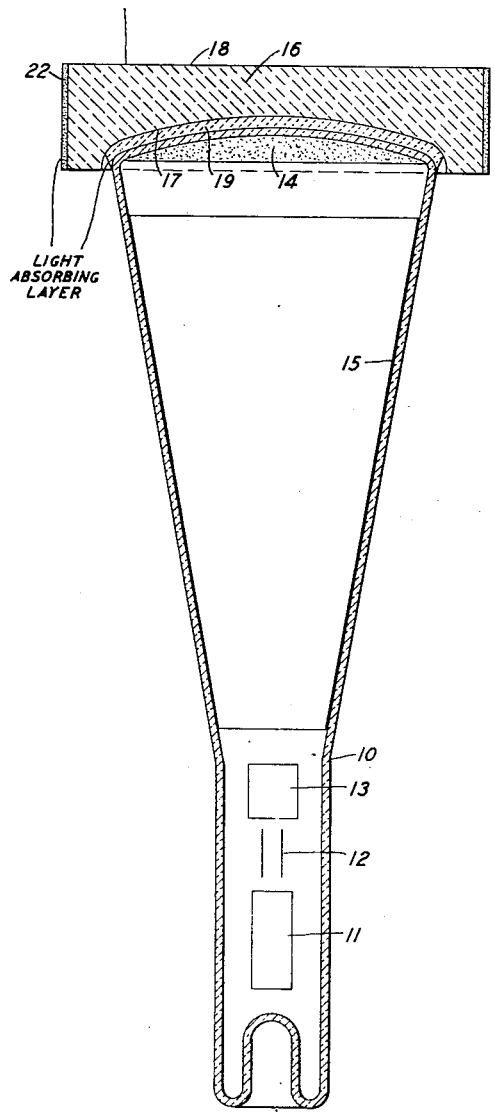
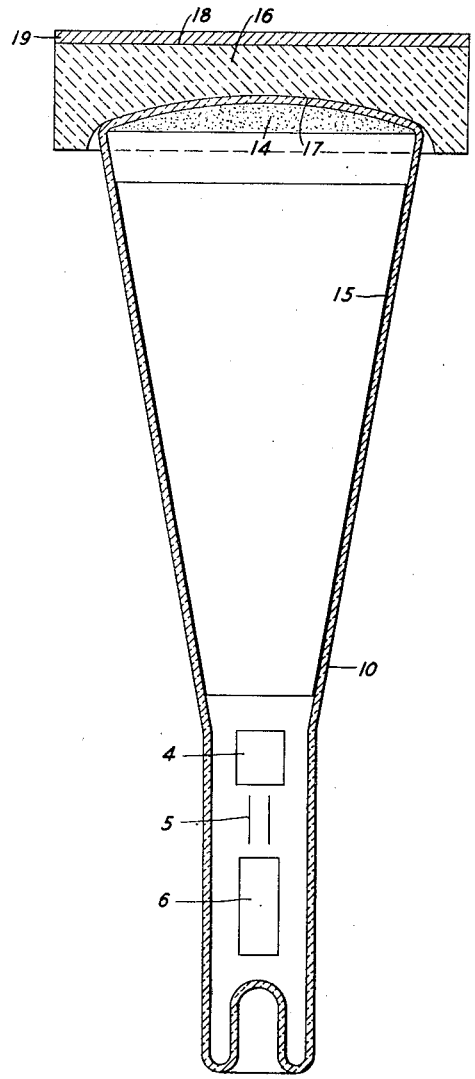
INVENTOR
C. J. CALBICK
BY
C. E. Sprague
ATTORNEY Feb. 23, 1943.    C. J. CALBICK    2,312,206
METHOD OF AND APPARATUS FOR REDUCING HALO FROM FLUORESCENT SCREENS
Filed June 12, 1940    2 Sheets-Sheet 2

INVENTOR
C. J. CALBICK
BY
C. E. Sprague
ATTORNEY

Patented Feb. 23, 1943

2,312,206

UNITED STATES PATENT OFFICE 2,312,206

METHOD OF AND APPARATUS FOR REDUCING HALO FROM FLUORESCENT SCREENS

Chester J. Calbick, Chatham, N. J., assignor to Bell Telephone Laboratories, Incorporated, New York, N. Y., a corporation of New York Application June 12, 1940, Serial No. 340,033

14 Claims. (Cl. 250—164)

This invention relates to luminescent screens and more particularly to methods of and apparatus for reducing halo from fluorescent screens.

In the operation of a cathode ray tube having a fluorescent screen at one end thereof, it has been noted that there is an objectionable halo around the illumination caused by the beam of electrons in the tube striking the fluorescent screen. The cause of halation has been found to be total reflection at the front surface of the glass. Consider a luminescent spot such as, for example, one which might be created on the fluorescent screen by a stationary electron beam. Rays of light will start out in all directions from the spot and since the luminescent material is at least partially in optical contact with the glass, these rays will be refracted at the upper surface. Those rays that strike the upper surface at angles (measured with respect to the normal to the surface) greater than a certain critical angle (called the minimum angle of total reflection) will be totally reflected to the lower surface. There they will be scattered by the screen material which will appear illuminated and the spot will be surrounded by a circle of light called the halo circle. The minimum angle of total reflection is given by the formula $$\theta_m = \sin^{-1} \frac{1}{\mu}$$

where $\mu$ the index of reaction of the glass is about 1.5, $\theta_m = 42$ degrees approximately, and the radius of the halo circle is approximately $r_m = 2t \tan \theta_m$, where $t$ is the thickness of the glass.

When the electron beam is used to reproduce a scene in television, dim areas adjacent the bright areas will be illuminated by this halation, so that the tone values in the dim areas will not be correctly reproduced.

It has already been suggested to reduce this halation by increasing the thickness of the end wall. Since the brightness of the halo circle is proportional to $1/t_2$, $t$ being the thickness of the glass, a thickness of one or two inches is sufficient to reduce the halo intensity to a point where it is unimportant and causes negligible distortion in the reproduction of television images.

A thick-ended tube, such as that suggested in the prior art, is impractical from the standpoint of glass technology, and to get away from this arrangement, it has also been suggested to use an oil cell on the end of the tube to reduce the halo, the coefficient of refraction of the oil being substantially the same as that of the glass on the end wall of the tube.

Tests have been conducted on oil cells of this type and it has been found that the oil becomes yellow after two or three months and it is necessary to replace it. Also there is some leakage around the fittings. Hence, oil cells are not entirely satisfactory.

It is an object of this invention to provide arrangements for reducing halo from the fluorescent screen of a cathode ray tube which does not have the disadvantages of the arrangements described above.

In accordance with the invention there is provided a transparent, organic plastic blank of a material which has at least substantially the same coefficient of refraction as glass but which is not nearly as heavy or as costly as a plate of glass. Suitable materials for this purpose are methacrylate resins. A member of this group having substantially the same index of refraction as glass and only about one-half the weight is the clear, transparent, methacrylate resin called "Lucite," manufactured by the Du Pont Company. The organic plastic blank has one end machined to fit the curved wall of the cathode ray tube and the other end machined flat. The advantages of using such an organic plastic instead of thick glass are (1) its cost is very much less than glass; (2) its weight is only a fraction of that of glass thus preventing the tube from becoming "screen end heavy" if thick glass were used; and (3) ease in machining. A plastic is, of course, much more suitable than oil because it obviously does not have the disadvantages pointed out above.

While the organic plastic blank may be used alone, it is preferable that it be used in connection with absorbent material as absorption operates to reduce the intensity of the normally reflected light more than that of the image itself. The absorbing layer may comprise a layer formed by suspending graphite particles in oil, such as the commercial product "Oildag" which is a colloidal suspension of carbon in oil manufactured by the Atchison Colloid Corporation of Port Huron, Michigan, or alternatively, by the suspension of suitable absorbing particles, such as graphite, in an organic cement which, when dry, has the proper index of refraction, such as Canada balsam. The absorbing layer need not owe its absorption to a suspension of absorbing particles as it might, for example, be an organic cement of proper index of refraction and absorbing power.

As a further modification the absorbing layer may be a polarized one. Many absorbing particles, such as graphite, possess the property of polarizing when they are suspended in a liquid in an electric field. By this means an absorbing layer can be produced whose absorption factor varies with direction. Such an absorbing layer transmits light in one direction but cuts out light in directions making large angles with this direction. Hence it tends to reduce halo much more than it reduces the brightness of the television image. A suitable polarized film can be produced by applying an electric potential between a metal plate laid on top of the organic plastic blank and the conducting coating in the cathode ray tube during the operation of the tube with suitable saw-tooth sweep voltages applied on the deflecting plates therein or saw-tooth sweep currents applied to deflecting coils. The direction of variation of absorption will be temporary in the case of the oil suspension but it is permanent if the voltage are applied during the drying of the organic cement suspension.

The absorbing layer instead of being located between the organic plastic blank and the tube wall may be located on top of the blank provided that the layer has the proper index of refraction. This arrangement has an advantage in producing uniform directional variation of absorption factor as a more uniform electric field is produced in the flat surface and, moreover, the layer can be cemented to the blank before the blank is cemented to the tube, the necessary electric field being easily applied by metallic electrodes.

As a further modification the organic plastic blank may itself be made absorbing either with or without directional variation. In this case the absorbing layer is replaced by a non-absorbing cement of proper index of refraction.

The halo may also be reduced by coating a light absorbing material on the periphery of the organic plastic blank.

While the invention has been described as applicable to a blank of organic plastic material, it will be obvious that certain of the features thereof, such as, for example, the absorbing material and the application thereof, may be useful in other arrangements, such as in connection with heavy glass plates or oil cells used to reduce halo.

The invention will be more readily understood by referring to the following description taken in connection with the accompanying drawings forming a part thereof, in which:

Fig. 1 shows a cathode ray tube with a blank of organic plastic material connected to the end wall thereof;

Fig. 2 shows a modification of the arrangement of Fig. 1;

Figure 3:
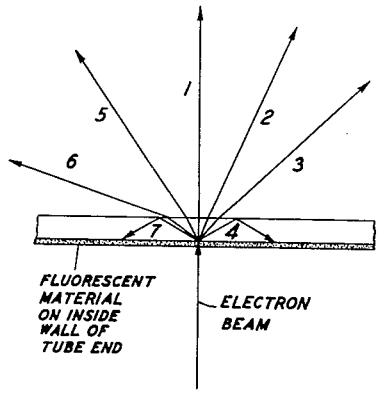
Figs. 3 and 4 are diagrams to explain the invention.

Referring more particularly to the drawings, Fig. 1 shows a cathode ray tube 10 comprising an envelope enclosing an electron gun 11, two pairs of electrostatic deflecting plates 12 and 13 and a fluorescent screen 14. A conducting coating 15 of any suitable material, such as the colloidal suspension of carbon in water known by the trade name of "Aquadag" and manufactured by the Atchison Colloid Corporation of Port Huron, Michigan, is placed on the inside wall of the tube 10 between the region of the deflecting plates 13 and the region of the fluorescent screen 14. In operation, electrons are generated and formed into a beam by the electron gun 11 which beam is caused to be deflected over the surface of the fluorescent screen 14 by saw-tooth potentials of appropriate frequencies applied to the sweep plates 12 and 13. Any well-known electron gun and deflecting plate arrangements may be utilized. If desired, electromagnetic sweep coils may be used in place of the sweep plates. The beam as it strikes the fluorescent screen 14 is of relatively small cross-section and it is desired that the light emitted from the fluorescent screen as the beam strikes the particular elemental area will be the same size as that elemental area. In the usual arrangement however, the viewed spot is much larger than the electron beam causing it, and this has been found to be due to total reflection at the front surface, that is, at the surface remote from the electron gun, of the glass envelope. Consider a luminescent spot, such as, for instance, might be created on the screen by a stationary electron beam illustrated in Fig. 3. Rays of light will start out in all directions from this spot and since the luminescent material is at least partially in optical contact with the glass they will be refracted at the upper surface as shown for rays 2, 3, 5 and 6. However, those that strike the upper surface at angles greater than a certain critical angle (called the minimum angle of total reflection) will be totally reflected to the lower surface, illustrated by rays 4 and 7. There they will be scattered by the screen material which will appear illuminated. Thus the spot will be surrounded by a circle of light called a halo circle. Since the minimum angle of total reflection is given by $$\theta_m = \sin^{-1} \frac{1}{\mu} \qquad (1)$$

where $\mu$, the index of refraction of the glass, is about 1.5, $\theta_m$ equals 42 degrees, approximately, and the radius of the halo circle is approximately $r_m = 2t \tan \theta_m$ where $t$ is the thickness of the glass.

When the electron beam is used to reproduce a scene in television, dim areas adjacent the bright areas will be illuminated by this halation, so that the tone values of the dim areas will not be correctly reproduced and thus the over-all picture may appear distorted.

Figure 4:
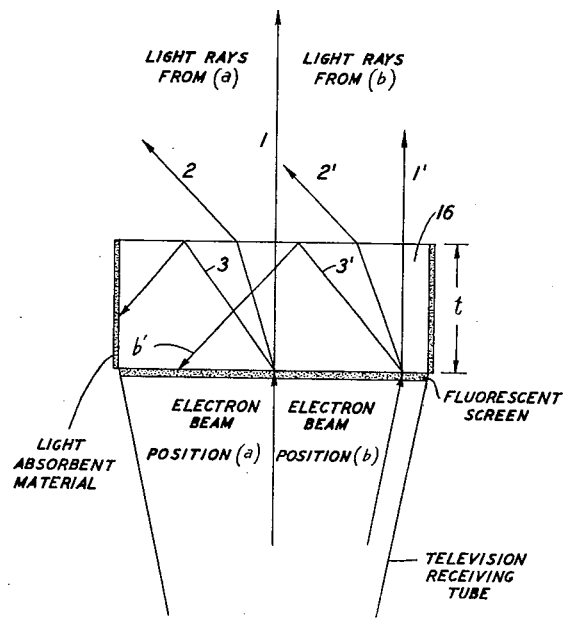

Returning to the consideration of stationary spots, let it be considered what happens when the thickness $t$ is greatly increased. Fig. 4 represents diagrammatically a portion of the cathode ray receiving tube with a thick end 16 of organic plastic material or glass. The sides of the thick end are painted on the outside with some light absorbent material, such as black lacquer or "Aquadag". The electron beam is represented in two positions, $a$ in the center and $b$ at the outer edge. Paths of rays are indicated, of which 3 and 3' are those of totally reflected rays. The other rays shown do not contribute to the halation except through normal reflection. As shown in Fig. 4, ray 3 is totally reflected at the upper surface and absorbed in the light absorbent layer. Ray 3', however, returns to illuminate the screen at $b'$.

If the thickness of the material 16 were made still greater, ray 3' would also be absorbed. Since, as shown above, $r_m = 2t \tan \theta_m = 1.18$ for $\mu = 1.5$, the thickness required for complete absorption is obtained by setting $r_m$ equal to the tube diameter, or $$t = \frac{D}{1.8}$$

where D equals 12 inches, $t$ equals 6.7 inches. However, further consideration indicates that such great thicknesses are unnecessary. This is because the intensity of the light in any direction from the spot is decreasing as the square of the distance. The ray 3' behaves as shown, but the number of totally reflected rays incident upon a small area at b' is quite small; in fact, the brightness of the halo circle is proportional to $1/t^2$. Thus a thickness of one or two inches is sufficient to reduce the halo intensity to a point where it is unimportant in the reproduction of television images. A thick-ended glass tube such as that shown in Fig. 4 is impractical from the standpoint of glass technology, and an oil film of the prior art, while it thickens the tube end optically, is impractical for other reasons. In accordance with this invention the member 16 in Fig. 4 is made of plastic material and is preferably shaped as shown in Fig. 1. In Fig. 1 the blank 16 is preferably of a suitable clear, transparent methacrylate resin, such as "Lucite", whose index of refraction is approximately equal to that of glass but whose weight is only one-half that of glass and whose cost is very much less than that of plate glass. The plastic can also be readily machined to the proper form. Other suitable clear, transparent methacrylate resins are "Plexiglass" and "Crystallite", manufactured by Rohm and Haas. Certain polystyrene plastics are also transparent but have not as yet been produced in stain-free condition in thicknesses greater than a few millimeters. The blank 16 has one surface 17 machined to correspond to the end of the cathode ray tube while the other surface 18 is made planar. This makes the end of the tube appear more flat than it really is. It may readily be shown that if the screen end has a radius of curvature $r_1$ and the end of the organic plastic blank 16 a radius of curvature $r_2$ (which will be negative if the end of the blank 16 is concave) then the apparent radius of curvature of the end of the tube as viewed through the blank is given by $$r_3 = \frac{\mu r_1 r_2}{r_2 + r_1(\mu - 1)}$$

The case of a planar end is given by setting $r_2 = \infty$, in which case $r_3 = \mu r_1$, i. e., the apparent radius of curvature of the end of the tube has been increased by the factor $\mu$ (index of refraction of the plastic). The formula above also shows that it is possible, by making $r_2 = -r_1 (\mu - 1)$, to cause $r_3$ to become infinite, that is, to make the end of the tube appear flat. The case where $\mu = 1.5$ causes this to occur for $r_2 = -1/2 r_1$, i. e. the end of the blank is concave, with a radius of curvature half that of the tube end. This usually will be such a small radius that the angle of view will be considerably restricted. The above formula is strictly true only for viewing along the axis.

The blank 16 may be cemented to the end wall of the tube by any suitable cement having an index of refraction substantially that of glass. If desired, the cement may have the additional property of being light absorbing, thus preventing a reflection of the rays with the consequent prevention of halo. An organic cement which when dry has the proper index of refraction and is slightly absorbing is Canada balsam. Another absorbing layer 19 may be made from a suspension of graphite particles in oil, such as, for example, the commercial product "Oildag."

It is a well-known law of optics that when light is passed through a succession of parallel layers of various indices of refraction, the amount of light totally reflected depends only on the indices of the medium in which the source is immersed and of the medium in which the light finally travels, providing none of the intervening layers has an index less than the smaller of these two indices. Since the final medium is usually air, this condition is usually fulfilled. Furthermore, exactly the same rays are totally reflected whatever the number of layers, if the above condition is fulfilled. If one of the layers has an index less than that of the source, some of the rays subject to total reflection will be totally reflected at the boundary of this layer; the remainder will proceed without undergoing total reflection until they encounter a medium of still lower index. In the present case, this would occur at the organic plastic-air boundary and the remainder of the rays subject to total reflection would there be totally reflected. If none of the intervening layers has an index less than that of the source, all of the rays subject to total reflection will be totally reflected at the final organic plastic-air boundary. Mathematically these statements can be expressed by the general law for the minimum angle of total reflection $$\theta_m = \sin^{-1} \frac{\mu_2}{\mu_1}$$

when light is passing from a medium of index $\mu_1$ into a medium of index $\mu_2$. The simple expression given above in Formula 1 is that for the case when $\mu_2 = 1$ (air). Obviously, no total reflection will occur if $\mu_2$ is greater than $\mu_1$, since $\sin \theta_m$ cannot exceed 1. All rays of light which strike the boundary at angles greater than $\theta_m$ (angles being measured with respect to the normal to the surface) are totally reflected. Application of this law of total reflection and the ordinary law of refraction to the rays passing through the successive layers makes evident the truth of the immediately foregoing statements.

Thus it is not necessary that the cement have the same index of refraction as that of the glass. It is advisable that the index of the cement should be not less than that of the glass, although for the purpose of this invention the small amount of total reflection at the glass-cement boundary such as would occur if, for example, the index of the cement were $\mu_2 = 1.45$ and the index of the tube wall were $\mu_1 = 1.50$ (yielding $\theta_m = 75°$ at the glass-cement boundary) would still permit a large reduction in the intensity of halation. The purpose of the invention would still be achieved in this case, since by far the greater amount of the light subject to total reflection is reflected at the air surface. However, if the cement, or any other intervening layer, has an index equal to or greater than that of the glass, all of the light subject to total reflection is reflected at the air surface, and the purpose of the invention is most completely achieved. If the tube wall is of a high melting point glass having a $\mu_1 = 1.50$ (for example), and as Canada balsam has a $\mu_2 = 1.53$, and since $\sin \theta_m$ cannot be greater than 1, total reflection does not occur. There are, of course, other optical cements which could equally well be used. These in general have higher refractive indices, since they are used for cementing glasses of higher index of refraction (i. e., a heavy flint glass may have $\mu = 1.85$) and are therefore entirely suitable for the present use.

Figure 5:
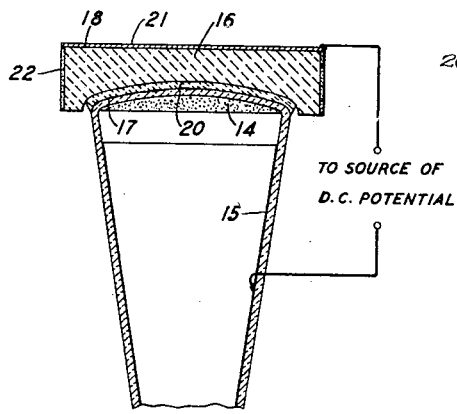
Figs. 5 and 6 illustrate methods of forming polarizing absorption layers in the arrangements of Figs. 1 and 2.

Many absorbing particles, such as graphite, possess the property of polarizing when they are suspended in a liquid in an electric field. It is therefore possible to produce an absorbing layer whose absorption factor varies with direction. This is illustrated in Fig. 5 if the vertical lines in the absorbing layer 20 are presumed to represent flakes of graphite. The layer therefore transmits light in the vertical direction and has a relatively high light absorption factor in such a direction, as for example, 45 degrees to the vertical. Such a directional variation in absorption is greatly to be desired since its effect is to reduce halo much more than it reduces the brightness of the television image. This is said to be a non-isotropic layer or film.

Such a film 20 can be produced (see Fig. 5) by applying an electric potential between a metal plate 21 laid on top of the blank 16 and the conducting coating 15 in the cathode ray tube during operation of the tube with suitable sawtooth sweep voltages being applied to the deflecting plates 12 and 13. The directional variation in absorption so produced is temporary in the case of the oil suspension layer mentioned above; but it is permanent if the voltage are applied during the drying of the organic cement suspension.

The absorbing layer 19 or 20 need not owe its absorption to a suspension of absorbing particles. It might, for example, be an organic cement of proper index of refraction and absorbing power, such as, for example, the cold adhesive comprising a mixture of brown shellac and coal tar and known as De Khotinsky cement, or similar material. In this case there is little possibility of directional variation of absorbing power.

In addition to the absorbing layer 19 or 20 or in place of it, the absorbing layer 22 may be coated around the periphery of the blank 16 as shown in Fig. 1 and corresponding to the absorbing coating of conducting material shown in Fig. 4.

Figure 6:
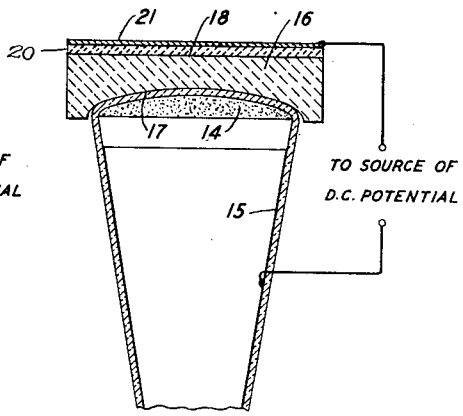

The layer 19 or 20 need not be located between the cathode ray tube 10 and the organic plastic blank 16. It might instead be located on top of the blank 16 (as shown in Figs. 2 and 6) provided that the layer has a proper index of refraction. This arrangement has in some cases an advantage in producing a directional variation of absorption factor uniform over the area of the top of the blank, since a more uniform electric field is produced at the flat surface when, as shown in Fig. 6, the direct current potential is applied between a metal plate 21 on top of the layer 20 and the conducting layer 15. Moreover, the layer 20 can be cemented to the block before the block is cemented to the tube, the necessary electric field being easily applied by metallic electrodes. The advantage obtained by cementing the absorbing layer to the blank before cementing the blank to the tube is not restricted to the case of the absorbing layer mounted on top of the blank. For example, the absorbing layer can be cemented to the block using sodium or potassium silicate (index of about 1.52) as a cement upon the curved surface which has been previously machined to fit the tube end. After the silicate layer has thoroughly dried, the blank can be cemented to the tube with Canada balsam. The silicate can be made absorbing by suspending in it absorbing particles as previously suggested for the organic cement.

Another method of achieving the desired absorption is to utilize a gelatin film of the type frequently used in optical filters. "Neutral gray" filters are readily obtained. Such a filter can easily be cemented to the flat top of an organic plastic blank. If previously molded to the shape of the tube end, such a filter can likewise be cemented between the blank and the tube end. These filters can be made to have directional properties, if desired.

In connection with all of the arrangements described above, it is essential to always produce perfect optical contact at all cemented surfaces.

Various modifications may occur to those skilled in the art without changing the scope of the invention herein described, which scope is indicated by the appended claims.

What is claimed is:

1. A cathode ray device comprising a tube having a transparent glass end wall structure with a given index of refraction, fluorescent material disposed in the form of a layer on the inside surface of said wall structure, means for producing a beam of electrons and for directing it towards said material to produce a luminous spot thereon, which luminous spot ordinarily has a halo produced by multiple reflection from the end wall structure of the tube, means, comprising a layer of a clear, transparent material which has substantially the same index of refraction as the glass and which is adjacent the outside wall of said tube, for reducing said halo, said layer having on the outside periphery thereof a coating of light absorbent material.

2. A cathode ray device comprising a tube having a transparent glass end wall structure with a given index of refraction, fluorescent material disposed in the form of a layer on the inside surface of said wall structure, means for producing a beam of electrons and for directing it towards said material to produce a luminous spot thereon, which luminous spot ordinarily has a halo produced by multiple reflection from the end wall structure of the tube, means, comprising a layer of a clear, transparent material which has substantially the same index of refraction as the glass and which is adjacent the outside wall of said tube, for reducing said halo, and a thin layer of light absorbing material between the end wall of the tube and the material of the same coefficient of refraction as the glass, said light absorbing layer being non-isotropic.

3. A cathode ray device comprising a tube having a transparent glass end wall structure with a given index of refraction, fluorescent material disposed in the form of a layer on the inside surface of said wall structure, means for producing a beam of electrons and for directing it towards said material to produce a luminous spot thereon, which luminous spot ordinarily has a halo produced by multiple reflection from the end wall structure of the tube, means, comprising a layer of a material which has substantially the same index of refraction as the glass and which is adjacent the outside wall of said tube, for reducing said halo, and a thin layer of light absorbing material between the end wall of the tube and the material of the same coefficient of refraction as glass, said light absorbing layer comprising carbon granules formed into a polarized absorbent layer produced by forming an electric field around said particles.

4. A cathode ray device comprising a tube having a transparent glass end wall structure with a given index of refraction, fluorescent material disposed in the form of a layer on the inside surface of said wall structure, means for producing a beam of electrons and for directing it towards said material to produce a luminous spot thereon, which luminous spot ordinarily has a halo produced by multiple reflection from the end wall structure of the tube, means, comprising a layer of a material which has substantially the same index of refraction as the glass and which is adjacent the outside wall of said tube, for reducing said halo, and a thin layer of light absorbing material between the end wall of the tube and the material of the same coefficient of refraction as glass, said light absorbing material comprising a suspension of graphite particles in oil.

5. A cathode ray device comprising a tube having a transparent glass end wall structure with a given index of refraction, fluorescent material disposed in the form of a layer on the inside surface of said wall structure, means for producing a beam of electrons and for directing it towards said material to produce a luminous spot thereon, which luminous spot ordinarily has a halo produced by multiple reflection from the end wall structure of the tube, means, comprising a layer of a clear, transparent material which has substantially the same index of refraction as the glass and which is adjacent the outside wall of said tube, for reducing said halo, and a thin layer of light absorbing material between the end wall of the tube and the material of the same coefficient of refraction as glass, said light absorbing material comprising a suspension of absorbing particles in an organic cement which has substantially the same index of refraction as glass.

6. A cathode ray device comprising a tube having a transparent glass end wall structure with a given index of refraction, fluorescent material disposed in the form of a layer on the inside surface of said wall structure, means for producing a beam of electrons and for directing it towards said material to produce a luminous spot thereon, which luminous spot ordinarily has a halo produced by multiple reflection from the end wall structure of the tube, and means, comprising a blank of transparent organic plastic material having substantially the same index of refraction as the glass, for reducing said halo, the plastic being being firmly attached to the end wall of said tube, and a light absorbing layer on top of the plastic blank.

7. A cathode ray device comprising a tube having a transparent glass end wall structure with a given index of refraction, fluorescent material disposed in the form of a layer on the inside surface of said wall structure, means for producing a beam of electrons and for directing it towards said material to produce a luminous spot thereon, which luminous spot ordinarily has a halo produced by multiple reflection from the end wall structure of the tube, and means, comprising a blank of clear, transparent, organic plastic material having substantially the same index of refraction as the glass, for reducing said halo, the plastic blank being firmly attached to the end wall of said tube, and a layer of light absorbing material around the periphery of said blank.

8. The method of forming a non-isotropic absorbing layer for use in connection with the end wall of a cathode ray tube comprising the step of coating a surface near the fluorescent screen of the cathode ray tube with moist conducting material, placing a metallic plate near said coating and applying a direct current potential between said coating and an anode member in said cathode ray tube.

9. In combination, a transparent support, a fluorescent screen on said support, means for exciting said screen to produce a spot of light, and organic plastic means adjacent said screen for reducing halation from said spot of light caused by multiple reflection from the surfaces of said transparent support, and a light absorbing cementing layer between said support and said plastic means.

10. In combination, a transparent support, a fluorescent screen on said support, means for exciting said screen to produce a spot of light, and organic plastic means adjacent said screen for reducing halation from said spot of light caused by multiple reflection from the surfaces of said transparent support, and a light absorbing cementing layer between said support and said plastic means, said absorbing cementing layer having an index of refraction at least as great as that of the supporting member.

11. In combination, a transparent support, a fluorescent screen on said support, means for exciting said screen to produce a spot of light, organic plastic means adjacent said screen for reducing halation from said spot of light caused by multiple reflection from the surfaces of said transparent support, and an optical filter cemented between the supporting member and the plastic means.

12. In combination, a transparent support, a fluorescent screen on said support, means for exciting said screen to produce a spot of light, organic plastic means adjacent said screen for reducing halation from said spot of light caused by multiple reflection from the surfaces of said transparent support, and an optical filter cemented to the plastic means on the side thereof remote from the supporting member.

13. The combination with a plate-like glass element having a layer of fluorescent material on one side thereof, of a layer of material having an index of refraction which is but slightly different at most from that of glass overlying said glass element on the side thereof opposite said fluorescent layer, said overlying layer being many times as thick as said glass element but not of sufficient thickness to eliminate the halo effect resulting from total reflection of a portion of the light from any spot on said fluorescent layer which is excited to luminescence, whereby the brightness of the halo is greatly reduced, and a light absorbing layer associated with said overlying layer to further reduce the brightness of the halo.

14. The combination with a plate-like glass element having a layer of fluorescent material on one side thereof, of a layer of organic plastic material having an index of refraction which is but slightly different at most from that of glass underlying said glass element on the side thereof opposite said fluorescent layer, said overlying layer being many times as thick as said glass element but not of sufficient thickness to eliminate the halo effect resulting from total reflection of a portion of the light from any spot on said fluorescent layer which is excited to luminescence, whereby the brightness of the halo is greatly reduced, and a light absorbing layer associated with said overlying layer to further reduce the brightness of the halo.

CHESTER J. CALBICK.